(12) United States Patent
Ebert

(10) Patent No.: US 7,694,490 B2
(45) Date of Patent: Apr. 13, 2010

(54) CLOSING TOOL ASSEMBLY

(75) Inventor: Detlef Ebert, Bad Nauheim (DE)

(73) Assignee: Poly-Clip System GmbH & Co. KG (DE)

( * ) Notice: Subject to any disclaimer, the term of this patent is extended or adjusted under 35 U.S.C. 154(b) by 0 days.

(21) Appl. No.: 12/044,789

(22) Filed: Mar. 7, 2008

(65) Prior Publication Data

US 2008/0216448 A1    Sep. 11, 2008

(30) Foreign Application Priority Data

Mar. 8, 2007    (DE) .................. 10 2007 011 423

(51) Int. Cl.
*B65B 51/04*    (2006.01)
*B23Q 1/26*    (2006.01)

(52) U.S. Cl. ............... 53/138.4; 29/243.56; 29/283

(58) Field of Classification Search ........... 53/417, 53/138.2, 138.4; 29/243.56, 283.5, 515; 452/30, 48

See application file for complete search history.

(56) References Cited

U.S. PATENT DOCUMENTS

| | | | | |
|---|---|---|---|---|
| 2,390,148 A | | 12/1945 | Hijams | |
| 2,545,560 A | | 3/1951 | Scott | |
| 2,670,524 A | * | 3/1954 | Frank | 452/48 |
| 2,912,249 A | | 11/1959 | Eckold | |
| 2,972,747 A | * | 2/1961 | Kelem | 29/566 |
| 3,343,253 A | * | 9/1967 | Omori | 29/505 |
| 3,381,359 A | * | 5/1968 | Schroeder | 29/56.6 |
| 3,587,204 A | * | 6/1971 | George | 53/138.4 |
| 3,636,611 A | * | 1/1972 | Rosenbaum | 29/56.6 |
| 3,779,122 A | * | 12/1973 | Sawvell | 83/698.91 |
| 4,043,011 A | | 8/1977 | Girauldi et al. | |
| 4,571,805 A | * | 2/1986 | Niedecker | 29/243.56 |
| 4,624,165 A | | 11/1986 | Bredow et al. | |
| 4,642,865 A | * | 2/1987 | Kelem | 29/243.56 |
| 4,833,907 A | * | 5/1989 | Grimaldo | 72/389.8 |
| 4,938,002 A | * | 7/1990 | Evans et al. | 53/138.4 |
| 4,939,885 A | * | 7/1990 | Steinke | 53/138.4 |
| 4,993,135 A | * | 2/1991 | Seeley et al. | 29/243.56 |
| 5,245,854 A | * | 9/1993 | Bruggink et al. | 72/481.7 |

(Continued)

FOREIGN PATENT DOCUMENTS

DE    1848069 U1    3/1962

(Continued)

OTHER PUBLICATIONS

EP 08 004 292 Search Report.

*Primary Examiner*—Paul R Durand
(74) *Attorney, Agent, or Firm*—Hahn Loeser & Parks LLP; Michael H. Minns

(57) ABSTRACT

A closing tool assembly for a clip machine, in particular for a sausage clipping machine, containing: at least one first and at least one second tool holder, which can be moved to positions opposite each other and reversibly towards each other, and each of which supports at least one first and at least one second closing tool, wherein the first and second closing tool are each replaceably held on the first and the second tool holder by means of a fixing device. A linear guide contour is further provided on at least one of the two tool holders, and a linear guide counter-contour complementary thereto is further provided on the associated closing tool.

20 Claims, 2 Drawing Sheets

U.S. PATENT DOCUMENTS

| | | | | |
|---|---|---|---|---|
| 5,463,892 A | * | 11/1995 | Nakagawa | 72/456 |
| 5,497,645 A | * | 3/1996 | Niedecker | 72/330 |
| 5,586,424 A | * | 12/1996 | Chen et al. | 53/138.2 |
| 5,794,486 A | * | 8/1998 | Sugimoto et al. | 72/481.3 |
| 6,003,360 A | * | 12/1999 | Runk et al. | 72/482.2 |
| 6,052,967 A | * | 4/2000 | Hambach | 53/138.4 |
| 6,101,785 A | * | 8/2000 | Bienert et al. | 53/138.4 |
| 6,182,734 B1 | * | 2/2001 | Ebert et al. | 156/581 |
| 6,298,635 B1 | * | 10/2001 | Bienert et al. | 53/417 |
| 6,675,554 B1 | * | 1/2004 | Hanten et al. | 53/138.4 |
| 6,732,564 B2 | * | 5/2004 | Runk et al. | 72/481.1 |
| 6,843,760 B2 | * | 1/2005 | Akami et al. | 483/28 |
| 6,928,852 B2 | * | 8/2005 | Enderink | 72/481.1 |
| 7,004,008 B2 | * | 2/2006 | Harrington et al. | 72/481.1 |
| 7,021,116 B2 | * | 4/2006 | Harrington et al. | 72/482.91 |
| 7,152,453 B2 | * | 12/2006 | Johnson et al. | 72/481.1 |
| 7,325,380 B2 | | 2/2008 | Ebert | |

FOREIGN PATENT DOCUMENTS

| | | |
|---|---|---|
| WO | 00/41933 A1 | 7/2000 |

* cited by examiner

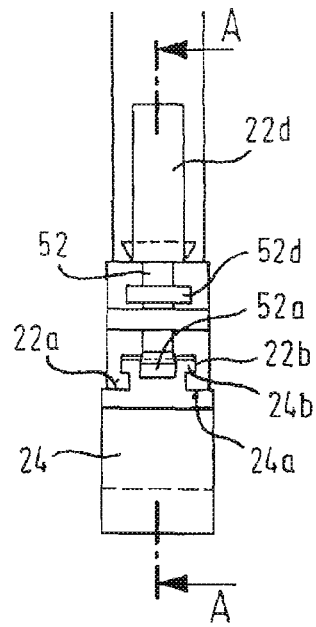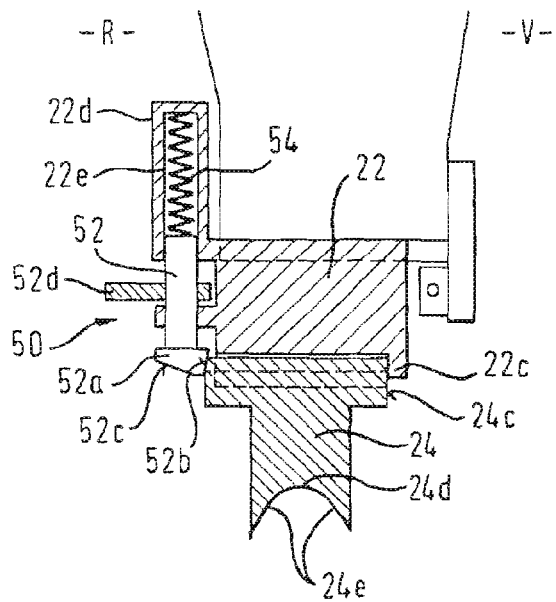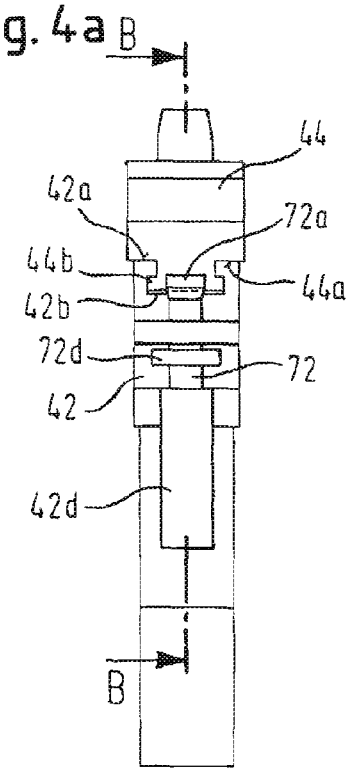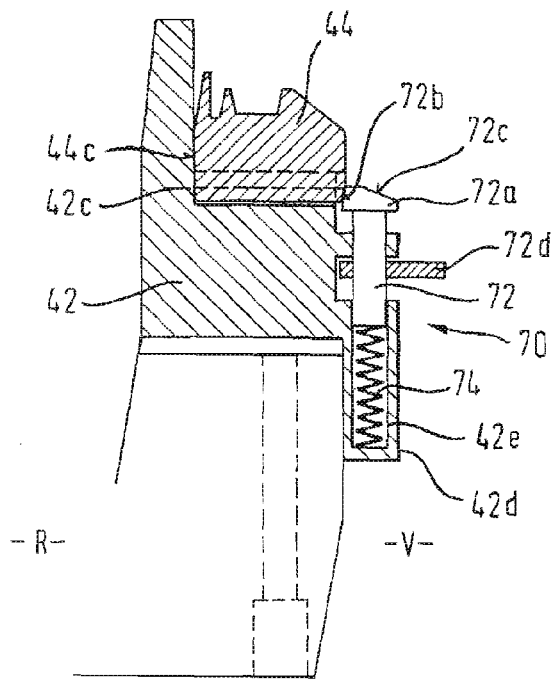

CLOSING TOOL ASSEMBLY

This patent application claims priority to German patent application DE 10 2007 011 423.2, filed Mar. 8, 2007, which is hereby incorporated herein by reference.

TECHNICAL FIELD

The invention relates to a closing tool assembly for a clip machine, in particular for a sausage clipping machine. The closing tool assembly has at least one first and at least one second tool holder, which can be moved to positions opposite each other and reversibly towards each other, and each of which supports at least one first and at least one second closing tool, wherein the first and second closing tools are releasably and replaceably held on the first and the second tool holder by means of fixing devices.

BACKGROUND OF THE INVENTION

An example of closing tools for a sausage clipping machine is disclosed in European patent application 1 140 633, (U.S. Pat. No. 6,675,554, which is incorporated herein by reference) for example. A lower die has a trough-like recess embodied such that the base of a clip to be applied and an adjoining portion of the legs of said clip are supported. In addition, an upper die has a concave recess on the side facing the lower die, in which recess the ends of the clip are bent and pressed together when the lower die and the upper die are brought together.

However, a disadvantage can arise with this very established technique when the closing tools have to be replaced, be it to replace worn parts or to adapt the clip machine to other packaging sizes. This is because, in the known closing tool assembly, the closing tools are fixed to the tool holders by means of screws and the like. When changing the closing tools, it is therefore necessary to loosen these screws, to pull the closing tools out of the retaining elements on the tool holders, then to insert the new tools into the retaining elements on the tool holders and finally to insert the screws into the screw holes on the tool holder and/or the closing tools. In doing so, it is essential to ensure that the closing tools are correctly aligned so that a clip is placed and closed with the desired precision. When performing this work, it is necessary that appropriate working tools are kept ready at the clip machine. Furthermore, when changing the closing tools, work must be carried out with these working tools in a relatively cramped space in the region of the closing tool assembly. The tools required for this work are not usually rustproof.

SUMMARY OF THE INVENTION

In one or more embodiments, a closing tool assembly for clip machines of the kind initially specified is provided, that permits simple and quick replacement of the closing tools.

By providing a linear guide contour on at least one of the two tool holders and a linear guide counter-contour complementary thereto on the associated closing tool in accordance with the present invention, it is possible to remove the closing tool from the tool holder and to replace it with the desired tool with little effort and without needing additional tools. In order to change one or both closing tools, all that is required is to release the fixing device. The closing tools can then be pulled out of the respective guides formed by the linear guide contour on the tool holder and by the linear guide counter-contour on the closing tool, and new closing tools can be inserted into the guides, an operation which can be carried out quickly and without additional tools. The linear guides also ensure, in a simple manner, that the closing tools are correctly aligned with each other.

If the linear guide contour of the tool holder and the linear guide counter-contour on the associated closing tool are provided in the planes of the respective contact surfaces, the linear guide contour is not burdened by compressive forces when closing the clips, so the closing tools are not displaced during closing. If, in contrast, the linear guide contour of the tool holder and the linear guide counter-contour on the associated closing tool are arranged at least approximately perpendicular to the plane of their respective contact surfaces, then although these are burdened by the compressive forces when closing the clips, they are not acted upon by any forces in their direction of displacement, as a result of which the closing tools are not displaced relative to the tool holders when closing the clips. The proposed guides are able to absorb forces acting perpendicular to the direction of displacement, which corresponds to the direction of load when closing the clips.

The linear guide contour and the linear guide counter-contour may be chosen from a wide range of different configurations. It is preferred that the linear guide formed by the linear guide of the tool holder and by the linear guide counter-contour of the closing tool is a flat guide. A prismatic guide, a dovetail guide or a cylindrical guide may also be provided instead of a flat guide.

It is also advantageous when the linear guide formed by the linear guide contour of the tool holder and by the linear guide counter-contour of the closing tool has at least one positioning stop. By this reliable and simple means, the rear end of the displacement path of the closing tool, viewed in the direction of insertion, is marked, and its position relative to the tool holder defined.

A wide range of solutions can likewise be provided for the fixing device. It is particularly advantageous when the fixing device has at least one fixing element which can be moved reversibly from a fixing position to a release position. If the fixing device has at least one actuating element for moving the fixing element, preferably manually, from the fixing position to the release position, the fixing element is externally accessible and can thus be operated manually. Tool-less changing of the closing tools is made possible as a result.

The path of movement of the fixing element may have any orientation relative to the path of movement defined by the linear guide contour of the tool holder and the linear guide counter-contour of the closing tool. If the fixing element can be reversibly moved from the fixing position to the release position in a direction at least approximately perpendicular to the guide direction of the linear guide formed by the linear guide contour of the tool holder and by the linear guide counter-contour of the closing tool, this allows a space-saving arrangement of the fixing device.

In order to maintain the fixing position of the fixing element in a reliable manner, it is also advantageous when the fixing element is biased into the fixing position by at least one elastic element, preferably by a pressure spring. Instead of elastically biasing the fixing element, the fixing element may also be reversibly movable into two defined positions, i.e. the fixing position and the release position. The two defined positions can be formed by detent elements and the like.

It is also advantageous when the fixing element has an insertion bevel which simplifies insertion of the closing tools into the linear guide contour. In addition, or alternatively, an insertion bevel which is advantageously embodied to be complementary to the insertion bevel of the fixing element may be provided on the closing tool itself.

One particularly space-saving configuration of the inventive closing tool assembly can be achieved by mounting the fixing device on the tool holder.

Other advantageous configurations and an embodiment of the invention shall now be described with reference to the description of an embodiment and to the attached drawings. The terms "top", "bottom", "left" and "right" used when describing the embodiment relate to the drawings oriented in such a way that the reference numerals and names of the figures can be read normally.

BRIEF DESCRIPTION OF THE DRAWING FIGURE

FIG. 3a shows a front view of the upper die of the closing tool assembly;

FIG. 3b shows a sectional view of the upper die along line A-A in FIG. 3a;

FIG. 4a shows a front view of the lower die of the inventive closing tool assembly; and FIG. 4b shows a sectional view of the lower die along line B-B in FIG. 4a.

DETAILED DESCRIPTION

Figure 2:
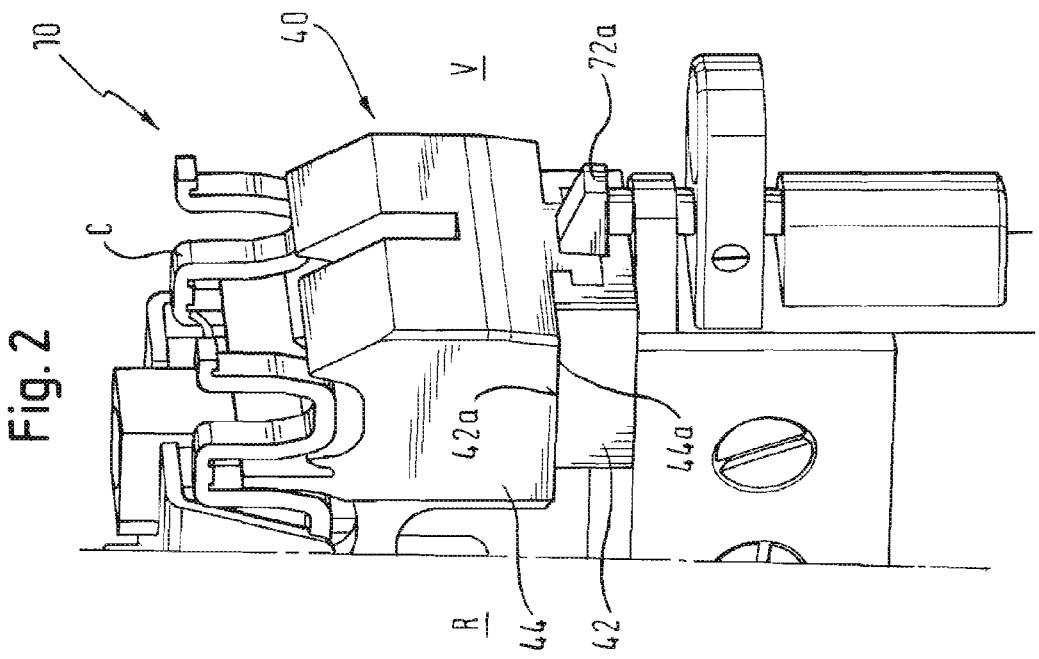
FIG. 2 shows a perspective view of a lower die of an embodiment of a closing tool assembly, viewed from the front side of a clip machine provided with said closing tool assembly.

As can be seen from FIGS. 1 and 2, in particular, an embodiment of a closing tool assembly 10 for a clip machine, in particular for a sausage clipping machine, has as its main components an upper die 20, and a lower die 40 arranged below upper die 20. Upper die 20 and lower die 40 can be moved reversibly in the vertical direction (cf. FIGS. 3b and 4b) towards and away from each other in order to move from a standby position into a clip closing position and vice versa. In FIGS. 3b and 4b, upper die 20 and lower die 40 of the closing tool assembly 10 are shown in the standby position, i.e. in their spaced-apart positions.

During normal operation of a sausage clipping machine, a gathered end or tress of sausage casing material free of filling material, not shown here, is located approximately in the middle between upper die 20 and lower die 40, in particular in the standby position of the closing tool assembly 10. A portion of unfilled sausage casing material that is drawn from a supply, and likewise not shown here, adjoins the unfilled tress in the horizontal direction on the one side of closing tool assembly 10. Adjoining in the opposite horizontal direction, on the other side of closing tool assembly 10, is a section of sausage casing material which is filled with filling material, in this case sausage meat, and which is in the process of forming a sausage (not shown). At the front free end of the sausage casing section already filled with sausage meat, the sausage casing has been closed by closing tool assembly 10 using a clip C, such that no filling material can escape.

Clip C may be made of an impressed aluminum wire and combined with a plurality of additional clips C to form a line of clips, not shown here, wherein clips C are pre-bent into a U- or V-shape (see FIG. 2) and joined by means of bent webs at the ends of their side legs. To place a clip C, the frontmost clip C is fed to lower die 40 in the known manner by advancing the line of clips. As long as the frontmost clip C is still attached to the line of clips it is followed by, it is stably held by the latter in lower die 40.

In the process of closing clip C, lower die 40 may be moved initially into its closing or end-of-stroke position. In this position, the frontmost clip C is pressed against the unfilled tress of the sausage casing material, which is located approximately in the middle between upper die 20 and lower die 40 when lower die 40 begins to move, and is clamped between said tress and lower die 40. Upper die 20 then moves towards lower die 40. Immediately before clip C is closed, the frontmost clip C is separated from the line of clips following it, at first by means of a shearing device which is provided on closing tools 20, 40, but which is not described here in any further detail. At that moment, the frontmost clip C is free and is pressed against lower die 40 by the tension of the tress only. Clip C is then deformed by upper die 20 coming closer to lower die 40 until closing tools 20, 40 have come so close to each other that clip C is closed around the tress free of filling material, such that no filling material can escape.

Figure 1:
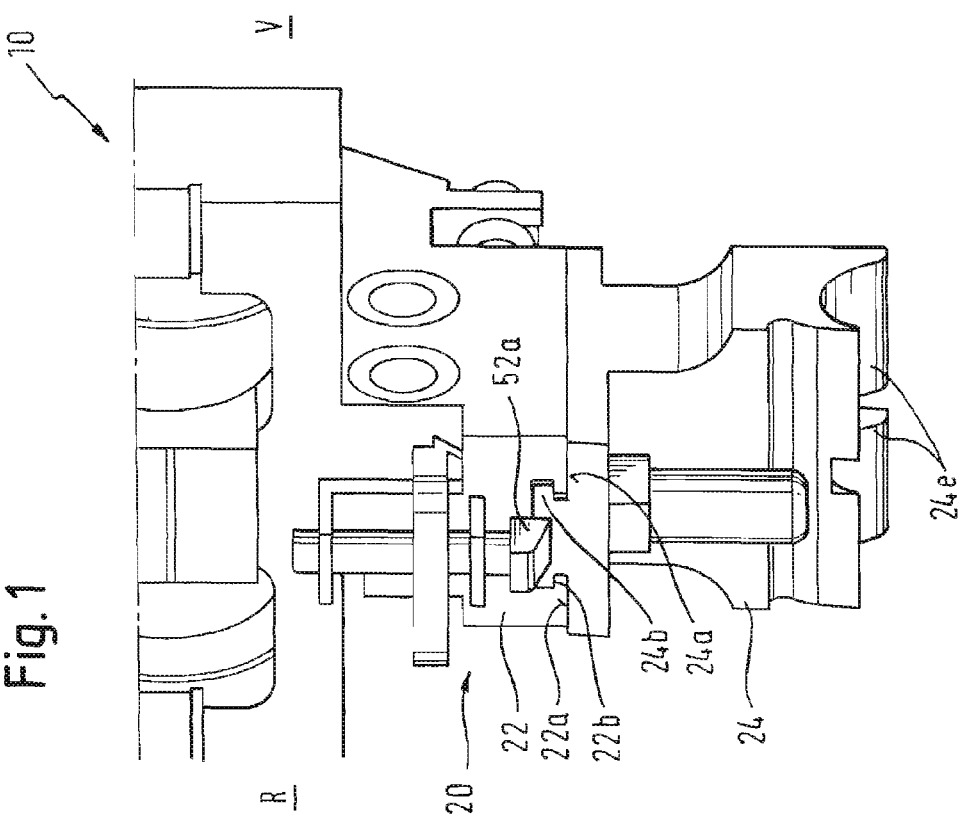
FIG. 1 shows a perspective view of an upper die of an embodiment of a closing tool assembly, viewed from the rear side of a clip machine provided with said closing tool assembly.

FIG. 1 shows upper die 20 of the closing tool assembly 10 according to one embodiment of the invention. The main components of upper die 20 are a tool holder 22 and an upper closing die tool 24 forming a first closing tool. Tool holder 22 is fixed by means of a first actuating device of the clip machine, not described here in further detail, which moves tool holder 22 and upper closing die tool 24 in order to move these reversibly from their standby position into the clip closing position.

The cuboidal tool holder 22 made of steel has a linear guide contour 22b of C-shaped cross-section on its upper side 22a, which in the mounted state points downwards in the direction of bottom die 40, said linear guide contour 22b extending, when likewise in the mounted state, over the entire upper side 22a of tool holder 22 in an orientation from the front side V to the rear side R of the clip machine, and which is used to guide the insertion of upper closing die tool 24. At its rear end, linear guide contour 22b is provided with a positioning stop 22c (See FIG. 3b) which protrudes from the upper side 22a of tool holder 22 and which limits the insertion movement of upper die tool 24 and gives the latter a defined position relative to tool holder 22.

As FIG. 3b shows, tool holder 22 is releasably mounted on the clip machine, for example by screws which are not defined in any further detail, with such an orientation that positioning stop 22c points to, or is located near, the front side V of the clip machine and linear guide contour 22b extends from the rear side R of the machine to positioning stop 22c. In other words, linear guide contour 22b is accessible from the rear side R of the machine when tool holder 22 has this orientation. However, tool holder 22 can essentially be mounted on the clip machine with such an orientation that positioning stop 22c points to, or is located near, the rear side R of the clip machine and upper closing die tool 24 can be inserted from the front side V of the clip machine into linear guide contour 22b of tool holder 22.

Upper closing die tool 24, which is likewise made of steel and which may be approximately anvil-shaped, likewise has on its underside 24a, which points upwards when tool 24 is in the mounted state, a linear guide contour 24b, which corresponds as a linear guide counter-contour to linear guide contour 22b of tool holder 22 and therefore has a T-shaped cross-section. Between linear guide contour 22b of tool holder 22 and linear guide contour 24b of upper closing die tool 24, a light slide fit may be provided so that tool 24 can be inserted easily with its linear guide contour 24b into linear guide contour 22b of tool holder 22, from where it can be pulled out again easily. As already mentioned, the insertion movement of upper closing die tool 24 is limited by the positioning stop 22c of tool holder 22, which abuts the rear side 24c of tool 24 when the end position is reached.

Two adjacent but spaced-apart clip shaping portions 24e are provided on the upper side 24d of upper closing die tool 24, which points downwards when tool 24 is in the mounted state. As can be seen from FIGS. 1 and 3b, the two clip shaping portions 24e have the shape of an upside-down letter "V" with a rounded bottom end. By means of the two clip shaping portions 24e, two clips can be processed simultaneously by upper closing die tool 24.

At the end of tool holder 22 opposite positioning stop 22c, said tool holder is also provided with a fixing or locking device 50 which secures upper closing die tool 24 against sliding out of linear guide contour 22b of tool holder 22. Fixing device 50 may be provided on a cylindrical extension 22d of tool holder 22. For this purpose, extension 22d has a blind hole 22e, in which an actuating hammer 52 of fixing device 50 and forming a fixing element is captively guided in such a manner that actuating hammer 52 may be moved back and forth along the bore axis of blind hole 22e between a fixing position and a release position. A helical compression spring or other biasing member 54 which elastically biases actuating hammer 52 in the fixing position bias is also provided between the bottom of blind hole 22e and actuating hammer 52.

Said actuating hammer 52 may have a hammer head 52a which is provided on its side facing tool holder 22 with a stop surface 52b abutted by upper closing die tool 24 when the latter is inserted into the linear guide contour 22b of tool holder 22. Hammer head 52a is provided on its opposite face with an insertion bevel 52c, over which upper closing die tool 24 slides with its leading edge when tool 22 is inserted, thus pushing actuating hammer 52 into blind hole 22e and its release position against the force of helical compression spring 54. To facilitate this operation, additional insertion bevels corresponding to insertion bevel 52c may be advantageously provided at the end of the closing die tool facing the positioning stop and on the underside thereof.

Also preferably attached to actuating hammer 52 is an actuating element 52d, which may be used for manual actuation of actuating hammer 52 in order to remove the upper closing die tool from tool holder 22 in the case of a tool change, for example. By this means, and by means of the linear guide between tool holder 22 and upper closing die tool 24, it is possible to change the upper closing die tool 24 without requiring any tools.

After upper closing die tool 24 has been fully installed and engaged with tool holder 22, actuating hammer 52 is moved back from the release position into the fixing position by helical compression spring 54, and upper closing die tool 24 is releasably fixed in its position on tool holder 22. To remove the upper closing die tool 24 from tool holder 22, all that is required is to press actuating hammer 52 into blind hole 22e against the force of helical compression spring 54, for example manually by means of actuating element 52d, so that upper closing die tool 24 can be pulled out of linear guide contour 22b of tool holder 22.

FIG. 2 shows lower die 40 of the closing tool assembly 10 according to the invention. The main components of lower die 40 are a tool holder 42 and a lower closing die tool 44 forming a second closing tool. Tool holder 42 is fixed by means of a first actuating device of the clip machine, not described here in further detail, which moves tool holder 42 and lower closing die tool 44 in order to move these reversibly from their standby position into the clip closing position.

As shown in FIG. 4a, the likewise cuboidally shaped tool holder 42 made of steel has a linear guide contour 42b of C-shaped cross-section on its upper side 42a, which in the mounted state points upwards in the direction of upper die 20, said linear guide contour 42b extending, when likewise in the mounted state, over the entire upper side 42a of tool holder 42 in an orientation from the front side V to the rear side R of the clip machine, and which is used to guide the insertion of lower closing die tool 44. At its rear end, linear guide contour 42b is provided with a positioning stop 42c which protrudes from the upper side 42a of tool holder 42 and which limits the insertion movement of lower die tool 44 and gives the latter a defined position relative to tool holder 42. (The reference signs are chosen in accordance with tool holder 20 and increased by 20.

As FIG. 4b shows, tool holder 42 is releasably mounted on the clip machine, for example by screws which are not defined in any further detail, with such an orientation that positioning stop 42c points to, or is located near, the rear side R of the clip machine and linear guide contour 42b extends from the front side V of the machine to positioning stop 42c. However, tool holder 42 can essentially be mounted on the clip machine with such an orientation that positioning stop 42c points to, or is located near, the front side V of the clip machine and lower closing die tool 44 can be inserted from the rear side R of the clip machine into linear guide contour 42b of tool holder 42.

Lower closing die tool 44, which is likewise made of steel, likewise has on its underside 44a a linear guide contour 44b, which corresponds as a linear guide counter-contour to linear guide contour 42b of tool holder 42 and therefore has a T-shaped cross-section. Between linear guide contour 42b of tool holder 42 and linear guide contour 44b of lower closing die tool 44, a light slide fit may likewise provided so that tool 44 can be inserted easily with its linear guide contour 44b into linear guide contour 42b of tool holder 42, from where it can be pulled out again easily. Here, too, the insertion movement is limited by the positioning stop 42c of tool holder 42, which abuts the rear side 44c of tool 24 when the end position is reached.

At the end of tool holder 42 opposite positioning stop 42c, said tool holder 42 is provided with a fixing or locking device 70, which secures lower closing die tool 44 against sliding out of linear guide contour 42b of tool holder 42, and which has a structure identical to that of the fixing device 50 on upper die 20. For this reason, no further description is provided (the reference signs are chosen in accordance with fixing device 50 and increased by 20).

It should be noted, finally, that the invention is not limited to the linear guide contours 22b, 24b shown in FIGS. 1-4. A dovetail guide, a prismatic guide or a cylindrical guide may also be provided as linear guide contours 22a, 24b. It is also possible to configure closing tool assembly 10 in such a way that linear guide contours 22a, 24b are arranged perpendicular to the contact plane of closing tools 20, 30.

The invention claimed is:

1. A closing tool assembly for a clip machine, the closing tool assembly comprising:
   a first tool holder and a second tool holder, the tool holders being movable away from each other and toward each other;
   a first closing tool removably attached the first tool holder and a second closing tool removably attached to the second tool holder; wherein,
   the first closing tool is removably engaged with the first tool holder by a first fixing device and the second closing tool is removably engaged with the second tool holder by a second fixing device, the first closing tool being moveable in a first direction; wherein, the first tool holder has a first linear guide contour the first closing tool has a first linear guide counter-contour that is complementary to the first linear guide contour, and the first fixing device being slidably moveable in a direction perpendicular to the first closing tool first direction and being moveable between a fixing position and a release position, the first fixing device when in the fixing position confronts an end surface of the first closing tool.

2. The closing tool assembly of claim 1, wherein the second tool holder has a second linear guide contour and the second closing tool has a second linear guide counter-contour that is complementary to the second linear guide contour.

3. The closing tool assembly of claim 2, wherein each of the fixing devices has an actuating hammer moveable from the fixing position to the release position.

4. The closing tool assembly of claim 3, wherein each of the actuating hammers has at least one actuating element for manually moving the fixing device from the fixing position to the release position.

5. The closing tool assembly of claim 3, wherein each of the actuating hammers is biased into the fixing position by a biasing element.

6. The closing tool assembly of claim 2, wherein a direction of insertion for the first closing tool on the first tool holder is opposite to a direction of insertion for the second closing tool on the second tool holder.

7. The closing tool assembly of claim 1, wherein a linear guide formed by the first linear guide contour of the first tool holder and by the first linear guide counter-contour of the first closing tool has at least one positioning stop.

8. The closing tool assembly of claim 1, wherein each of the fixing devices has an actuating hammer moveable from the fixing position to the release position.

9. The closing tool assembly of claim 8, wherein each of the actuating hammers has at least one actuating element for manually moving the fixing device from the fixing position to the release position.

10. The closing tool assembly of claim 8, wherein the actuating hammer of the first fixing device is reversibly moveable from the fixing position to the release position in a direction at least approximately perpendicular to a first guide direction formed by the first linear guide contour of the first tool holder and by the first linear guide counter-contour of the first closing tool.

11. The closing tool assembly of claim 8, wherein each of the actuating hammers is biased into the fixing position by a biasing element.

12. The closing tool assembly of claim 11, wherein the biasing element is a spring.

13. The closing tool assembly of claim 8, wherein the actuating hammer of the first fixing device has an insertion bevel.

14. The closing tool assembly of claim 13, wherein the first closing tool has an insertion bevel.

15. The closing tool assembly of claim 1, wherein the first closing tool has an insertion bevel.

16. The closing tool assembly of claim 1, wherein the first fixing device is mounted on the first tool holder.

17. The closing tool assembly of claim 1, wherein the first linear guide contour has a C-shaped transverse cross-section.

18. The closing tool assembly of claim 17, wherein the first linear guide counter-contour has a T-shaped transverse cross-section.

19. The closing tool assembly of claim 1, wherein the first linear guide contour comprises a recess.

20. The closing tool assembly of claim 19, wherein the first linear guide counter-contour comprises a projection.

* * * * *